(12) United States Patent
Endou et al.

(10) Patent No.: US 10,196,568 B2
(45) Date of Patent: Feb. 5, 2019

(54) PRODUCTION METHOD FOR POLYMERIZABLE LIQUID CRYSTAL COMPOSITION

(71) Applicant: DIC CORPORATION, Tokyo (JP)

(72) Inventors: Koichi Endou, Kita-adachi-gun (JP); Yasuhiro Kuwana, Kita-adachi-gun (JP); Hidetoshi Nakata, Kita-adachi-gun (JP); Mika Yamamoto, Kita-adachi-gun (JP); Kunihiko Kotani, Kita-adachi-gun (JP); Hiroshi Hasebe, Kita-adachi-gun (JP); Yoshiyuki Ono, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/030,011

(22) PCT Filed: Oct. 7, 2014

(86) PCT No.: PCT/JP2014/076775
§ 371 (c)(1),
(2) Date: Apr. 15, 2016

(87) PCT Pub. No.: WO2015/056600
PCT Pub. Date: Apr. 23, 2015

(65) Prior Publication Data
US 2016/0237351 A1   Aug. 18, 2016

(30) Foreign Application Priority Data
Oct. 17, 2013   (JP) .................. 2013-216320

(51) Int. Cl.
| | | |
|---|---|---|
| *C09K 19/38* | (2006.01) |
| *C09K 19/34* | (2006.01) |
| *C08F 2/06* | (2006.01) |
| *C09K 19/20* | (2006.01) |
| *C09K 19/30* | (2006.01) |
| *C09K 19/54* | (2006.01) |
| *G02B 5/30* | (2006.01) |
| *C08F 220/30* | (2006.01) |
| *C08F 222/10* | (2006.01) |
| *C09K 19/04* | (2006.01) |
| *C09K 19/12* | (2006.01) |

(52) U.S. Cl.
CPC ............ *C09K 19/3405* (2013.01); *C08F 2/06* (2013.01); *C09K 19/2014* (2013.01); *C09K 19/3059* (2013.01); *C09K 19/3068* (2013.01); *C09K 19/3402* (2013.01); *C09K 19/54* (2013.01); *G02B 5/3016* (2013.01); *C08F 2220/303* (2013.01); *C08F 2222/102* (2013.01); *C08F 2222/1033* (2013.01); *C09K 2019/0437* (2013.01); *C09K 2019/0448* (2013.01); *C09K 2019/122* (2013.01); *C09K 2019/2035* (2013.01); *C09K 2019/2042* (2013.01); *C09K 2019/2078* (2013.01); *C09K 2019/3009* (2013.01); *C09K 2019/3016* (2013.01); *C09K 2019/3075* (2013.01); *C09K 2019/3083* (2013.01); *C09K 2019/343* (2013.01); *C09K 2019/3408* (2013.01); *C09K 2019/3422* (2013.01); *C09K 2019/3425* (2013.01)

(58) Field of Classification Search
CPC ....................................... C09K 19/38
See application file for complete search history.

(56) References Cited

U.S. PATENT DOCUMENTS

| | | | | |
|---|---|---|---|---|
| 2009/0269513 A1* | 10/2009 | Nishiyama | ............... | C09D 4/00 428/1.2 |
| 2011/0186776 A1* | 8/2011 | Kuriyama | ............... | C09K 19/06 252/299.61 |
| 2014/0221574 A1* | 8/2014 | Schadt | ................... | C08F 220/10 525/303 |

FOREIGN PATENT DOCUMENTS

| | | | |
|---|---|---|---|
| JP | 2008-280771 A | | 11/2008 |
| JP | 2009-29929 A | | 2/2009 |
| JP | 2009029929 A | * | 2/2009 |
| JP | 2009-98133 A | | 5/2009 |
| JP | 2009-109831 A | | 5/2009 |
| JP | 2009109831 A | * | 5/2009 |
| JP | 2010-175931 A | | 8/2010 |

(Continued)

OTHER PUBLICATIONS

International Search Report dated Jan. 13, 2015, issued in countrepart Application No. PCT/JP2014/076775 (2 pages).

*Primary Examiner* — Chanceity N Robinson
(74) *Attorney, Agent, or Firm* — Westerman, Hattori, Daniels & Adrian, LLP

(57) ABSTRACT

The present invention provides a method for producing a polymerizable liquid crystal composition which produces films being uncolored and having no cissing and good alignment when applied to a substrate, and also provides a polymerizable liquid crystal composition produced by the method and an optically anisotropic body using the polymerizable liquid crystal composition. Specifically, the present invention provides a method for producing a polymerizable liquid crystal composition, the method comprising a step (I) of preparing a polymerizable solution by mixing at least one polymerizable compound having at least one polymerizable functional group and one or two or more organic solvents and heating and stirring the resultant mixture; and a step (II) of mixing the polymerizable solution with a polymerization initiator, and also provides a polymerizable liquid crystal composition produced by the method and an optically anisotropic body using the polymerizable liquid crystal composition.

12 Claims, No Drawings

(56) References Cited

FOREIGN PATENT DOCUMENTS

| JP | 2010175931 A | * | 8/2010 |
| JP | 2012-236982 A | | 12/2012 |
| JP | 2012236982 A | * | 12/2012 |

* cited by examiner

PRODUCTION METHOD FOR POLYMERIZABLE LIQUID CRYSTAL COMPOSITION

TECHNICAL FIELD

The present invention relates to a method for producing a polymerizable liquid crystal composition related to the production of a polymerizable liquid crystal composition with high quality and to an optically anisotropic body using a polymerizable liquid composition produced by the method.

BACKGROUND ART

Polymerizable liquid crystal compositions are useful as members constituting optically anisotropic bodies, and the optically anisotropic bodies are applied as, for example, a polarization film and a retardation film to various liquid crystal displays. The polarization film and retardation film can be formed by applying a polymerizable liquid crystal composition to a substrate and then curing the polymerizable liquid crystal composition by heating or irradiation of active energy rays in a state in which the polymerizable liquid crystal composition is aligned by an alignment film or the like. The resultant films are required to be uncolored and to have no occurrence of cissing and have good alignment. The term "cissing" represents a phenomenon that when a polymerizable liquid crystal composition is applied to a substrate, depressions reaching the substrate occur.

In general, polymerizable liquid crystal compositions for coating each contain a polymerization initiator, a surfactant, a polymerization inhibitor, and the like and are used in a state of being dissolved in an organic solvent. A method proposed as a method for producing a polymerizable liquid crystal composition includes adding a photoinitiator and a surfactant to a polymerizable liquid crystal composition to prepare a mixture and then dissolving the resultant mixture in an organic solvent at a concentration of 25 wt % (Patent Literature 1). Also, a method including stirring and mixing a polymerizable liquid crystal compound, an optical photopolymerization initiator, a polymerization inhibitor, and an organic solvent at 70° C. for 30 minutes and then returning the temperature to room temperature is also disclosed (Patent Literature 2).

However, polymerizable liquid crystal compositions produced by known methods have the problem of coloring property of films produced by application to a substrate and the problem of the occurrence of cissing.

CITATION LIST

Patent Literature

PTL 1: Japanese Unexamined Patent Application Publication No. 2009-098133
PTL 2: Japanese Unexamined Patent Application Publication No. 2008-280771

SUMMARY OF INVENTION

Technical Problem

A problem to be solved by the present invention is to provide a method for producing a polymerizable liquid crystal composition which produces films being uncolored and having no cissing and good alignment when applied to a substrate, and also provide a polymerizable liquid crystal composition produced by the method and an optically anisotropic body using the polymerizable liquid crystal composition.

Solution to Problem

In the present invention, as a result of earnest research on a method for producing a polymerizable liquid crystal composition in order to solve the problems described above, it was found that storage stability is improved by adding a photopolymerization initiator in a specified step and that an optically anisotropic body having no color, no cissing, and good alignment can be produced by using the polymerizable liquid crystal composition, leading to the achievement of the present invention.

That is, the present invention provides a method for producing a polymerizable liquid crystal composition including a step (I) of preparing a polymerizable solution by mixing at least one polymerizable compound having at least one polymerizable functional group and one or two or more organic solvents and heating and stirring the resultant mixture; and a step (II) of mixing the polymerizable solution with a polymerization initiator, and also provides a polymerizable liquid crystal composition produced by the production method and an optically anisotropic body using the polymerizable liquid crystal composition.

Advantageous Effects of Invention

An optically anisotropic body having no color, no cissing, and good alignment can be produced by using a method for producing a polymerizable liquid crystal composition of the present invention.

DESCRIPTION OF EMBODIMENTS

A method mode of a method for producing a polymerizable liquid crystal composition according to the present invention is described below. The method for producing a polymerizable liquid crystal composition of the present invention includes at least two steps including a step (I) of preparing a polymerizable solution by mixing at least one polymerizable compound having at least one polymerizable functional group and one or two or more organic solvents and heating and stirring the resultant mixture; and a step (II) of mixing the polymerizable solution with a photopolymerization initiator.

In addition, in the present invention "liquid crystal" in the term "polymerizable liquid crystal composition" is intended to represent that liquid crystallinity is exhibited when the polymerizable liquid crystal composition is applied to a substrate, dried, and then polymerized by irradiation with light such as ultraviolet light or the like or by heating.

(Polymerizable Compound)

At least one polymerizable compound having at least one polymerizable functional group used in the step (I) is not particularly limited as long as the compound shows liquid crystallinity singly or in a composition with another compound and has at least one polymerizable functional group, and any known usual compound can be used.

Specifically, the compound is represented by general formula (1),

[Chem. 1]

$$P\text{-}(Sp)_m\text{-}MG\text{-}R^1 \qquad (1)$$

(in the formula, P represents a polymerizable functional group,

Sp represents an alkylene group having 0 to 18 carbon atoms (the alkylene group may be substituted by one or more halogen atoms or CN, and one $CH_2$ group or two or more unadjacent $CH_2$ groups present in the alkylene group may be each independently substituted by —O—, —S—, —NH—, —N($CH_3$)—, —CO—, —COO—, —OCO—, —OCOO—, —SCO—, —COS—, or —C≡C— in a form in which oxygen atoms are not directly bonded to each other), m represents 0 or 1, MG represents a mesogenic group, $R^1$ represents a hydrogen atom, a halogen atom, a cyano group, an alkyl group having 1 to 18 carbon atoms, the alkyl group may be substituted by one or more halogen atoms or CN, and one $CH_2$ group or two or more unadjacent $CH_2$ groups present in the alkyl group may be each independently substituted by —O—, —S—, —NH—, —N($CH_3$)—, —CO—, —COO—, —OCO—, —OCOO—, —SCO—, —COS—, or —C≡C— in a state in which oxygen atoms are not directly bonded to each other, or $R^1$ represents a structure represented by general formula (1-a),

[Chem. 2]

$$-(Sp)_m-P \qquad (1\text{-}a)$$

(in the formula, P represents a reactive functional group, Sp represents a spacer group having 0 to 18 carbon atoms, and m represents 0 or 1), and when a plurality of each of P and Sp are present, they may be the same or different).

Preferred examples of the polymerizable functional group include a vinyl group, a vinylether group, an acryl group, a (meth)acryl group, a glycidyl group, an oxetanyl group, a maleimide group, and a thiol group, and from the viewpoint of productivity, a vinyl group, a vinylether group, an acryl group, a (meth)acryl group, and a glycidyl group are more preferred, a vinyl group, a vinylether group, an acryl group, and a (meth)acryl group are even more preferred, and an acryl group and a (meth)acryl group are particularly preferred.

The mesogenic group represented by MG is represented by general formula (1-b),

[Chem. 3]

$$-Z0\text{-}(A1\text{-}Z1)_n\text{-}A2\text{-}Z2\text{-}A3\text{-}Z3\text{-} \qquad (1\text{-}b)$$

(in the formula, A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, which may have as a substituent one or more of F, Cl, $CF_3$, $OCF_3$, a CN group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, an alkenoyloxy group, and/or general formula (1-a):

[Chem. 4]

$$-(Sp)_m-P \qquad (1\text{-}a)$$

(in the formula, P represents a reactive functional group, Sp represents a spacer group having 0 to 18 carbon atoms, m represents 0 or 1, and when a plurality of each of P and Sp are present, they may be the same or different), Z0, Z1, Z2, and Z3 each independently represent —COO—, —OCO—, —$CH_2CH_2$—, —$OCH_2$—, —$CH_2O$—, —CH═CH—, —C≡C—, —CH═CHCOO—, —OCOCH═CH—, —$CH_2CH_2COO$—, —$CH_2CH_2OCO$—, —COO$CH_2CH_2$—, —OCO$CH_2CH_2$-, —CONH—, —NHCO—, an alkyl group having 2 to 10 carbon atoms which may have a halogen atom, or a single bond, n represents 0, 1, or 2, and when a plurality of each of A1 and Z1 are present, they may be the same or different).

Among compounds represented by the general formula (1), monofunctional compounds each having one polymerizable functional group in its molecule include compounds represented by general formula (1-1) and general formula (1-2) below.

General Formula (1-1)

[Chem. 5]

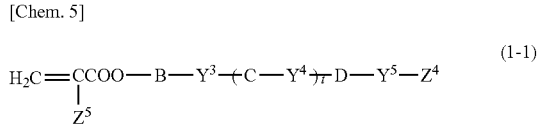

(In the formula, $Z^4$ represents a hydrogen atom, a halogen atom, a cyano group, or a hydrocarbon group having 1 to 18 carbon atoms (a linear alkyl group or an alkyl group which may have a branched chain), $Z^5$ represents a hydrogen atom or a methyl group, t represents 0 or 1, B, C, and D each independently represent a 1,4-phenylene group, a 1,4-phenylene group in which unadjacent CH groups are substituted by nitrogen, a 1,4-cyclohexylene group, a 1,4-cyclohexylene group in which one $CH_2$ group or two unadjacent $CH_2$ groups are substituted by oxygen or sulfur atoms, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group, which may have as a substituent one or more of an alkyl group having 1 to 7 carbon atoms, an alkoxy group, an alkanoyl group, a cyano group, or a halogen atom, $Y^3$ and $Y^4$ each independently represent —$CH_2CH_2$—, —$CH_2O$—, —$OCH_2$—, —COO—, —OCO—, —C≡C—, —CH═CH—, —CF═CF—, —$(CH_2)_4$—, —$CH_2CH_2CH_2O$—, —$OCH_2CH_2CH_2$-, —CH═CH$CH_2CH_2$—, —$CH_2CH_2$CH═CH—, —CH═CHCOO—, —OCOCH═CH—, —$CH_2CH_2COO$—, —$CH_2CH_2OCO$—, —COO$CH_2CH_2$—, or —OCO$CH_2CH_2$—, and $Y^5$ represents a single bond, —O—, —COO—, —OCO—, or —CH═CHCOO—), and general formula (1-2):

[Chem. 6]

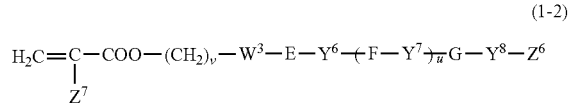

(in the formula, $Z^6$ represents a hydrogen atom, a halogen atom, a cyano group, or a hydrocarbon group having 1 to 18 carbon atoms, $Z^7$ represents a hydrogen atom or a methyl group, $W^3$ represents a single bond, —O—, —COO—, or —OCO—, v represents an integer of 1 to 18, u represents 0 or 1, E, F, and G each independently represent a 1,4-phenylene group, a 1,4-phenylene group in which unadjacent CH groups are substituted by nitrogen, a 1,4-cyclohexylene group, a 1,4-cyclohexylene group in which one $CH_2$ group or two unadjacent $CH_2$ groups are substituted by oxygen or sulfur atoms, a 1,4-cyclohexenyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, or a 1,4-naphthylene group, which may be substituted by one or more of an alkyl group having 1 to 7 carbon atoms, an alkoxy group, an alkanoyl group, a cyano group, or a halogen atom, $Y^6$ and $Y^7$ each independently represent —$CH_2CH_2$—, —$CH_2O$—, —$OCH_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=$CHCH_2CH_2$—, —$CH_2CH_2$CH=CH—, —CH=CHCOO—, —OCOCH=CH—, —$CH_2CH_2$COO—, —$CH_2CH_2$OCO—, —COO$CH_2CH_2$—, or —OCO$CH_2CH_2$—, and $Y^6$ represents a single bond, —O—, —COO—, —OCO—, or —CH=CHCOO—).

Examples of compounds represented by the general formula (1-1) and the general formula (1-2) include, but are not limited to, those described below.

[Chem. 7]

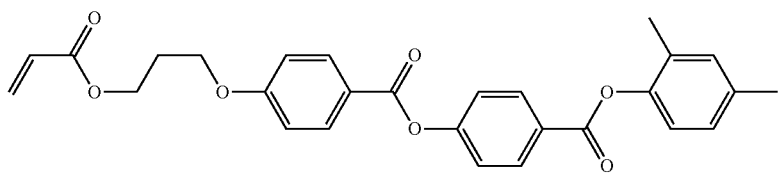

(1-3)

[Chem. 8]

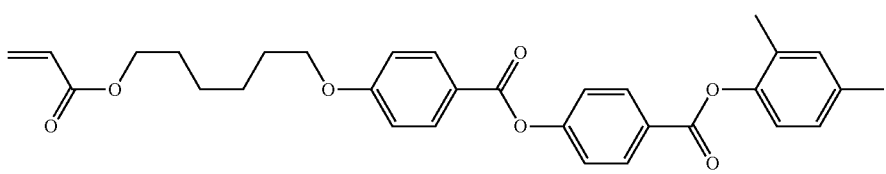

(1-4)

[Chem. 9]

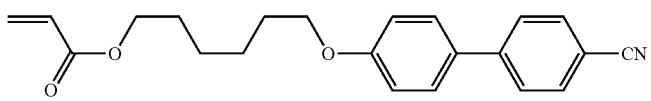

(1-5)

[Chem. 10]

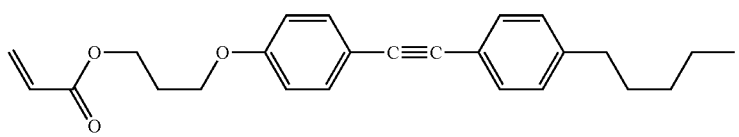

(1-6)

[Chem. 11]

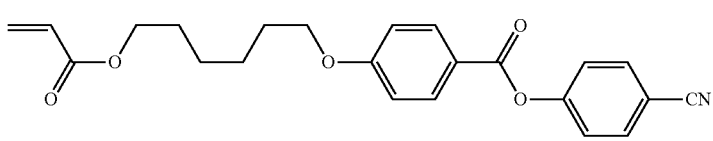

(1-7)

[Chem. 12]

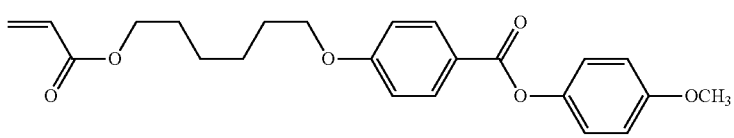

(1-8)

-continued
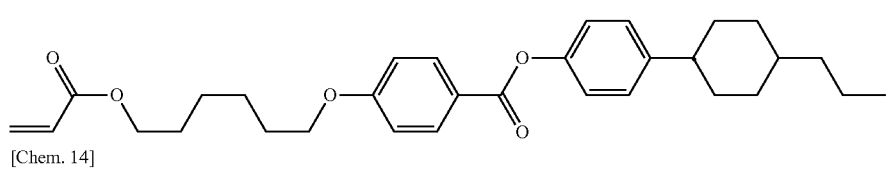
(1-9)
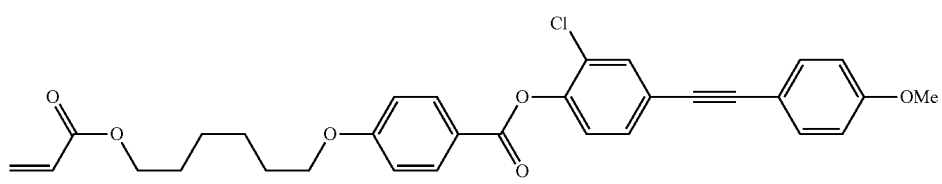
(1-10)
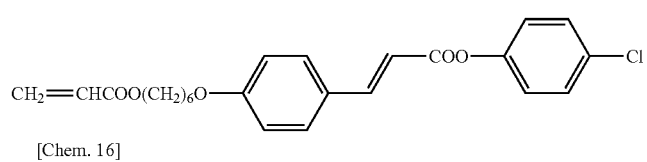
(1-11)
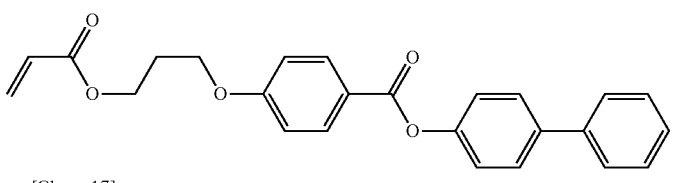
(1-12)
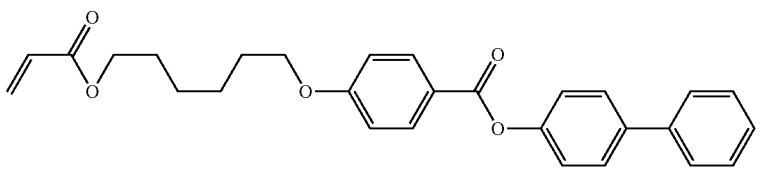
(1-13)
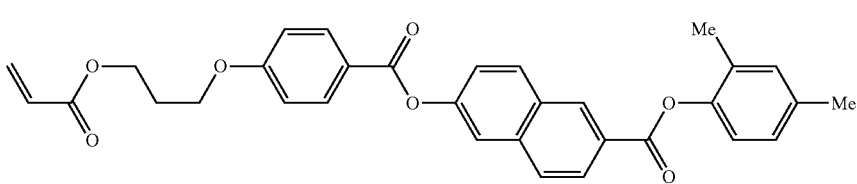
(1-14)
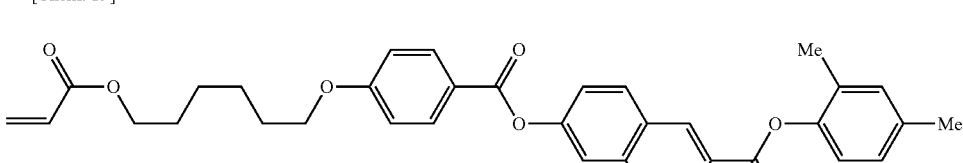
(1-15)
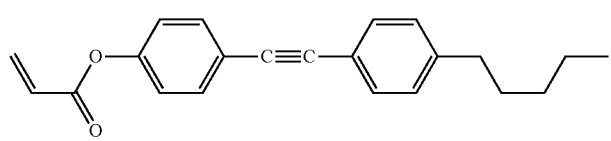
(1-16)

[Chem. 21]

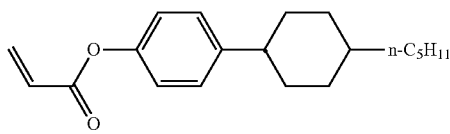

(1-17)

[Chem. 22]

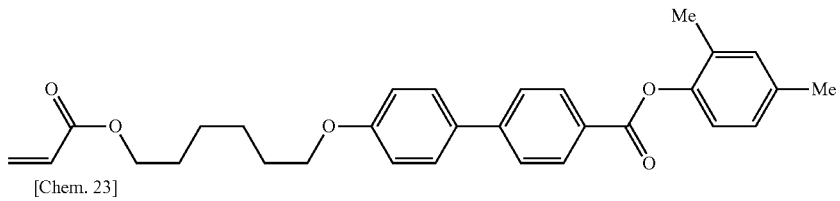

(1-18)

[Chem. 23]

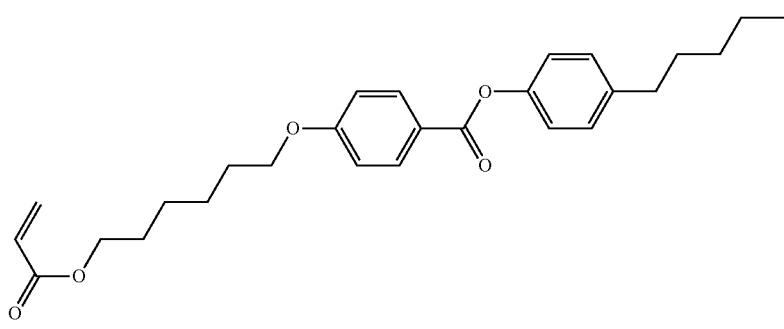

(1-19)

[Chem. 24]

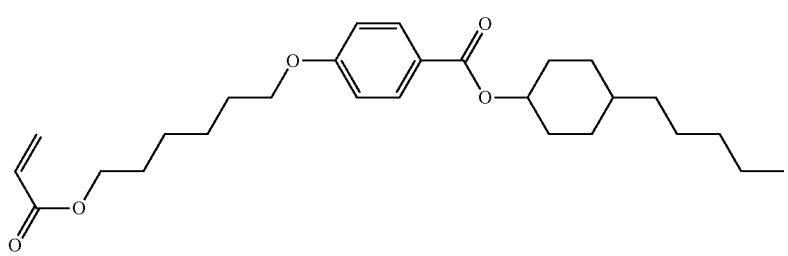

(1-20)

These compounds can be used alone or as a mixture of two or more.

The total content of monofunctional compounds each having one polymerizable functional group in its molecule is preferably 0 to 90% by mass, more preferably 0 to 80% by mass, even more preferably 0 to 60% by mass, and particularly preferably 0 to 40% by mass, relative to the total amount of the polymerizable compound used.

Among the compounds represented by the general formula (1), bifunctional compounds each having a substituent as $R^1$ represented by the general formula (1-a) and two polymerizable functional groups in its molecule includes compounds represented by general formula (2-1) below.

General Formula (2-1)

[Chem. 25]

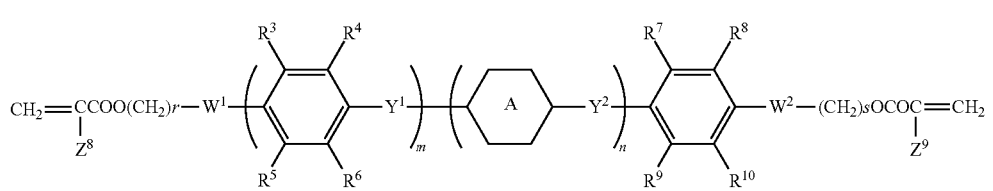

(2-1)

(In the formula, m represents 0 or 1, n represents 0, 1, or 2, $W^1$ and $W^2$ each independently represent a single bond, —O—, —COO—, or —OCO—, $Y^1$ and $Y^2$ each independently represent a single bond, —C≡C—COO—, —OCO—C≡C—, —COO—, —OCO—, —CH$_2$—CH$_2$-COO—, or —OCO—CH$_2$—CH$_2$—, when a plurality of $Y^2$ are present, they may be the same or different, A represents a 1,4-phenylene group, a 1,4-cyclohexylene group, or a naphthalene-2,6-diyl group, when a plurality of A are present, they may be the same or different, r and s each independently represent an integer of 1 to 18, $Z^8$ an $Z^9$ each independently represent a hydrogen atom or a methyl group, and $R^3$ to $R^{10}$ each independently represent a hydrogen atom, an alkyl group having 1 to 7 carbon atoms, an alkoxy group, an alkanoyl group, a cyano group, or a halogen atom.)
Examples of compounds represented by the general formula (2-1) include, but are not limited to, those described below.
[Chem. 26]
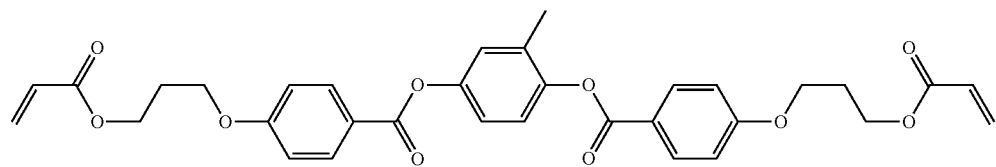
(2-2)
[Chem. 27]
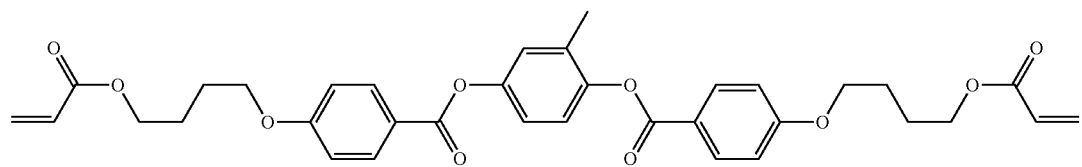
(2-3)
[Chem. 28]
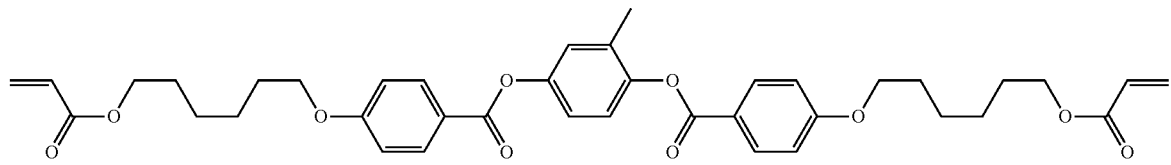
(2-4)
[Chem. 29]
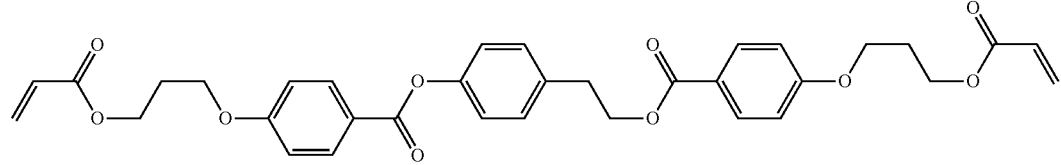
(2-5)
[Chem. 30]
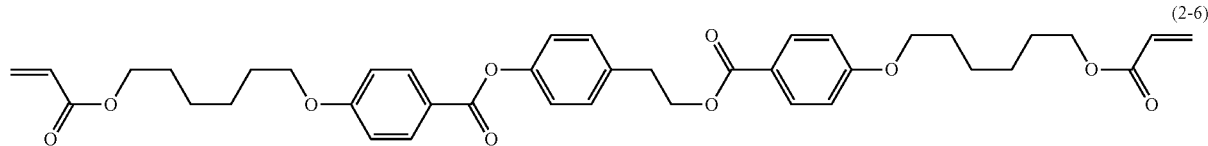
(2-6)
[Chem. 31]
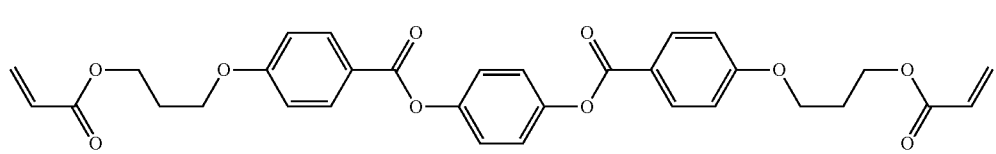
(2-7)
[Chem. 32]
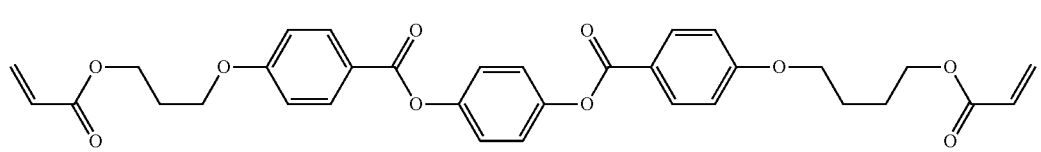
(2-8)

[Chem. 33]

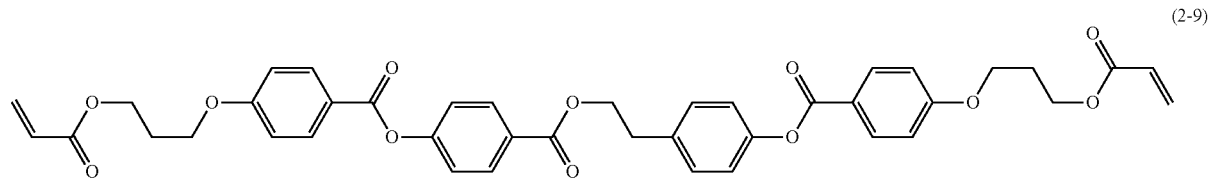

(2-9)

These compounds can be used alone or as a mixture of two or more.

The total content of bifunctional compounds each having two polymerizable functional groups in its molecule is preferably 10% to 100% by mass, more preferably 12% to 97% by mass, and particularly preferably 15% to 95% by mass, relative to the total amount of the polymerizable compound used.

Among the compounds represented by the general formula (1), polyfunctional compounds each having three or more polymerizable functional groups in its molecule includes compounds below.

[Chem. 34]

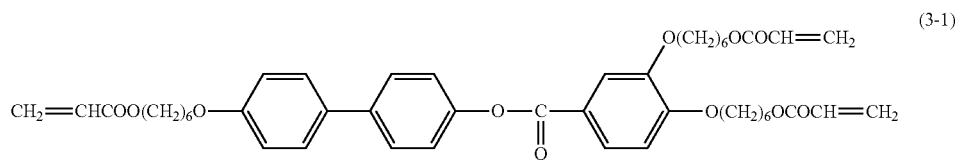

(3-1)

The total content of polyfunctional compounds each having three or more polymerizable functional groups in its molecule is preferably 0% to 30% by mass, more preferably 0% to 25% by mass, and particularly preferably 0% to 20% by mass, relative to the total amount of the polymerizable compound used.

For the purpose of producing a chiral nematic phase, the polymerizable liquid crystal composition of the present invention may be mixed with a chiral compound. Among chiral compounds, a compound having a polymerizable functional group in its molecule is particularly preferred.

The polymerizable functional group in the chiral compound is particularly preferably an acryloyloxy group. The amount of the chiral compound mixed is required to be properly adjusted according to the helical twisting power of the compound, but the content thereof is preferably 0% to 85% by mass, more preferably 0% to 80% by mass, and particularly preferably 0% to 75% by mass relative to the total amount of the polymerizable compound and the chiral compound.

Examples of the chiral compound include compounds of formulae (4-1) to (4-8).

[Chem. 35]

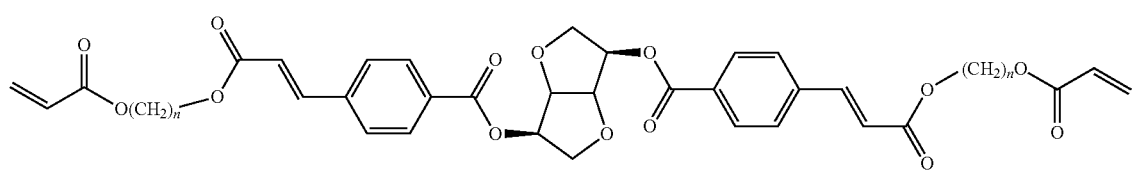

(4-1)

(4-2)
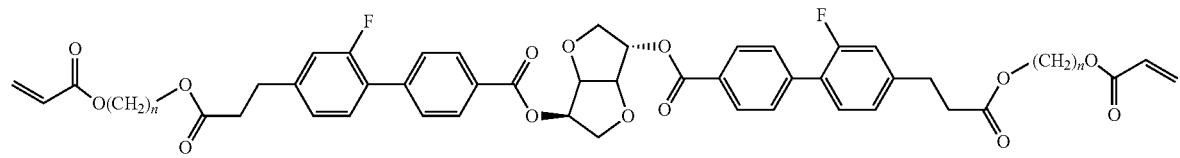
(4-3)
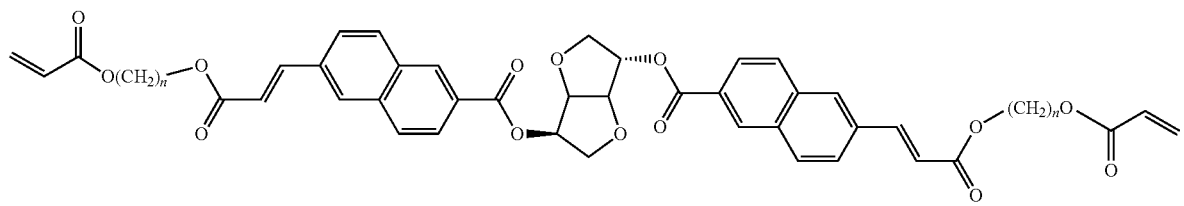
(4-4)
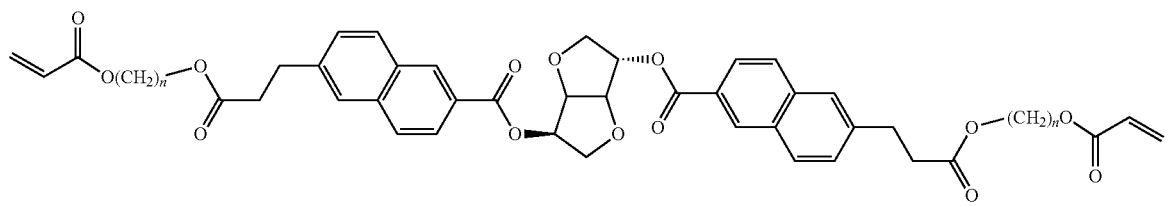
(4-5)
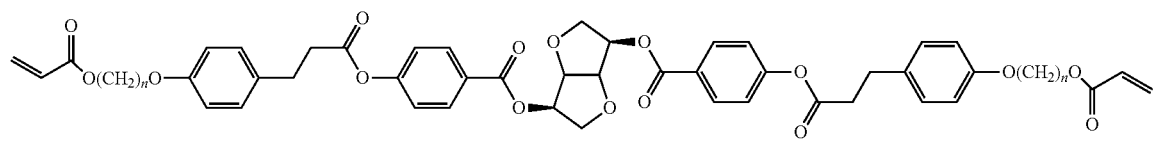
(4-6)
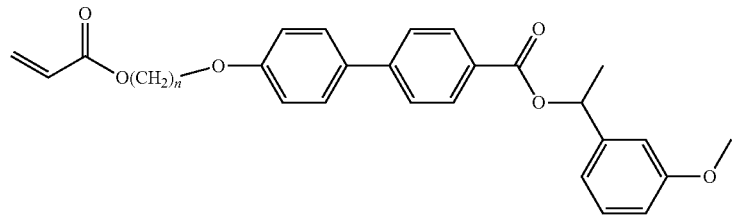
(4-7)
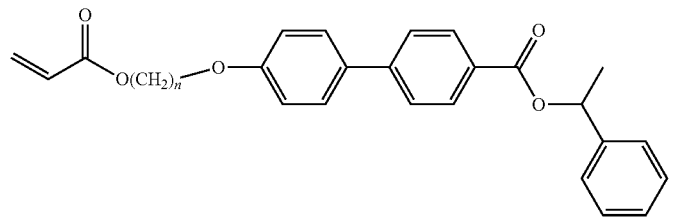
(4-8)
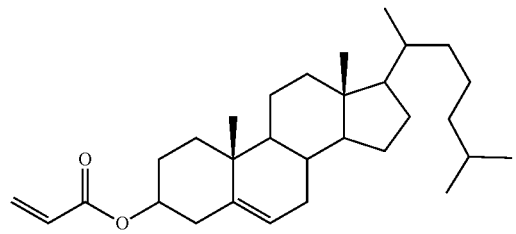

(In the formulae, n represents an integer of 2 to 12.) Further examples of the chiral compounds include compounds of formulae (4-9) to (4-12).

[Chem. 36]

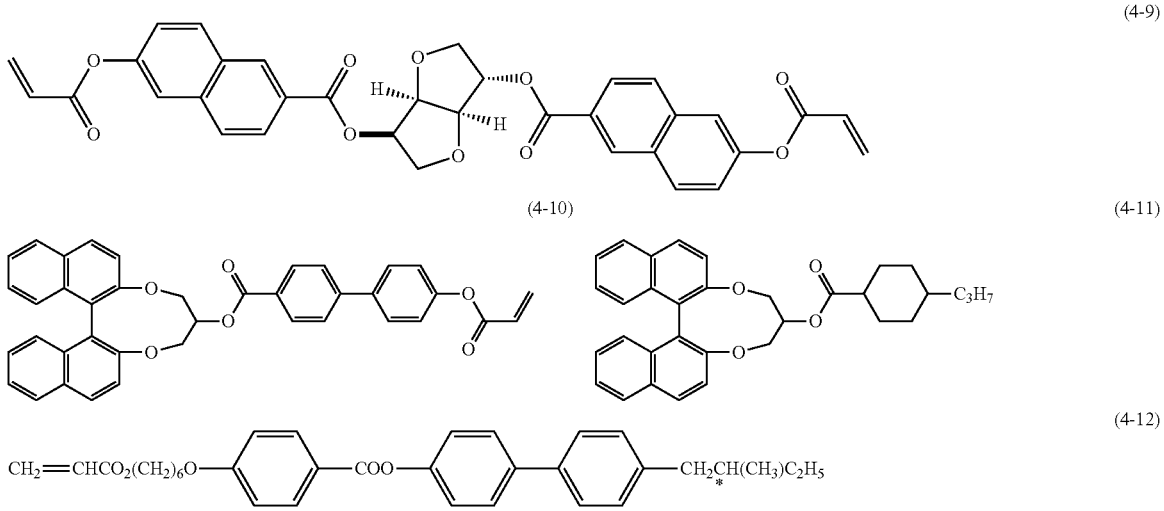

(Organic Solvent)

The organic solvent used in the polymerizable solution of the present invention is not particularly limited but is preferably an organic solvent in which the polymerizable compound shows good solubility, and is also preferably an organic solvent which can be dried at a temperature of 100° C. or less. Examples of the organic solvent include aromatic hydrocarbons such as toluene, xylene, cumene, mesitylene, and the like; ester solvents such as methyl acetate, ethyl acetate, propyl acetate, butyl acetate, and the like; ketone solvents such as methyl ethyl ketone, methyl isobutyl ketone, cyclohexanone, cyclopentanone, and the like; ether solvents such as tetrahydrofuran, 1,2-dimethoxyethane, anisol, and the like; amide solvents such as N,N-dimethylformamide, N-methyl-2-pyrrolidone, and the like; propylene glycol monomethyl ether acetate; diethylene glycol monomethyl ether acetate; γ-butyrolactone; chlorobenzene; and the like. These can be used alone or as a mixture of two or more, but any one or more of the ketone solvents, the ether solvents, the ester solvents, and the aromatic hydrocarbon solvents is preferably used from the viewpoint of solution stability.

The ratio of the organic solvent in the polymerizable solution is not particularly limited as long as a coated state is not significantly impaired because the polymerizable liquid crystal composition used in the present invention is generally used by coating. However, the total amount of the polymerizable compound contained in the polymerizable liquid crystal composition is preferably 1% to 60% by mass, more preferably 3% to 55% by mass, and particularly preferably 5% to 50% by mass.

The production method of the present invention requires the step (I) of preparing the polymerizable solution by mixing the polymerizable compound in the organic solvent, but heating and stirring is preferably performed for preparing the uniform polymerizable solution. The temperature during heating and stirring may be properly adjusted in consideration of the solubility of the polymerizable compound used in the organic solvent, but from the viewpoint of productivity, the temperature is preferably 15° C. to 110° C., more preferably 15° C. to 105° C., even more preferably 15° C. to 100° C., and particularly preferably 20° C. to 90° C.

Continuing from the step of preparing the polymerizable solution, the production method of the present invention requires the step (II) of mixing the polymerizable solution with the polymerization initiator. When the temperature of the polymerizable solution in mixing the polymerization initiator is excessively high, the polymerizable compound is easily polymerized by radicals produced from the polymerization initiator. Therefore, because the possibility of coloring a resultant film occurs, the temperature is preferably 0° C. to 70° C., more preferably 5° C. to 60° C., and particularly preferably 15° C. to 50° C.

When among the compounds represented by the general formula (1), a compound having a melting point of 100° C. or more is used, the method for producing a polymerizable liquid crystal composition of the present invention exhibits a particularly excellent effect. When the polymerizable solution is prepared by mixing a compound having a high melting point in the organic solvent, it is necessary to increase the temperature of the organic solvent during dissolution, and when the photopolymerization initiator is mixed at a high temperature, the resultant polymerizable liquid crystal composition may be colored due to the influence of proceeding of polymerization of the polymerizable compound. Therefore, the solution temperature in the step (II) of mixing the polymerization initiator is preferably lower than the heating temperature during heating and stirring in the step (I) of preparing the polymerizable solution. Specifically, the solution temperature in the step (II) of mixing the polymerization initiator is preferably 20° C. or more, more preferably 30° C. or more, lower than the heating temperature during heating and stirring in the step (I) of preparing the polymerizable solution.

In preparing the polymerizable liquid crystal composition, stirring-mixing is preferably performed by using a dispersion stirrer. Examples of the dispersion stirrer which can be used include dispersers having a stirring blade such as a disper, a propeller, a turbine blade, or the like, a paint shaker, a planetary stirring apparatus, a shaking machine, a shaker, a rotary evaporator, and the like. Other than these, an ultrasonic irradiation apparatus can be used.

In preparing the polymerizable solution, the stirring rotational speed is preferably properly adjusted according to the stirring apparatus used, and the stirring rotational speed for preparing the uniform polymerizable solution is preferably 10 rpm to 1000 rpm, more preferably 50 rpm to 800 rpm, and particularly preferably 150 rpm to 600 rpm.

(Polymerization Inhibitor and Antioxidant)

In order to enhance the solution stability of the polymerizable solution of the present invention, the polymerization inhibitor and/or the antioxidant is preferably added. Examples of a compound used as the polymerization inhibitor and/or the antioxidant include a hydroquinone derivative, a nitroamine-based polymerization inhibitor, a hindered phenol-based antioxidant, and the like. More specific examples thereof include p-methoxyphenol, tert-butyl hydroquinone, methyl hydroquinone, and Wako Pure Chemical Industries, Ltd. "Q-1300" and "Q-1301", BASF Corporation "IRGANOX 1010", "IRGANOX 1035", "IRGANOX 1076", "IRGANOX 1098", "IRGANOX 1135", "IRGANOX 1330", "IRGANOX 1425", "IRGANOX 1520", "IRGANOX 1726", "IRGANOX 245", "IRGANOX 259", "IRGANOX 3114", "IRGANOX 3790", "IRGANOX 5057", "IRGANOX 565", and the like.

The polymerization inhibitor and the antioxidant are preferably added in the step of preparing the polymerizable solution by mixing the polymerizable compound in the organic solvent and heating an stirring the resultant mixture, but may be added in the subsequent step of mixing the polymerization inhibitor to the polymerizable solution or in both steps.

The amount of each of the polymerization inhibitor and antioxidant added is preferably 0.01% to 1.0% by mass and more preferably 0.05% to 0.5% by mass relative to the polymerizable composition.

(Photopolymerization Initiator)

The method for producing a polymerizable liquid crystal composition of the present invention is characterized by mixing the polymerizable solution with the polymerization initiator after the step of preparing the polymerizable solution by mixing the polymerizable compound in the organic solvent and heating and stirring the resultant mixture. This is because heating is required for uniformly dissolving the polymerizable compound in the organic solvent within a short time, and thus polymerization reaction of the polymerizable compound is prevented from proceeding due to the radicals generated from the polymerization initiator by heating when the polymerization initiator is mixed at the same time during preparation of the polymerizable solution.

At least one photopolymerization initiator is preferably added. Examples thereof include BASF Corporation "Irgacure 651", "Irgacure 184", "Irgacure 907", "Irgacure 127", "Irgacure 369", "Irgacure 379", "Irgacure 819", "Irgacure 2959", "Irgacure OXE01", "Irgacure OXE02", "Lucirin TPO", and "Darocur 1173", LAMBSON Ltd. "Esacure 1001M", "Esacure KIP150", "Speedcure BEM", "Speedcure BMS", "Speedcure MBP", "Speedcure PBZ", "Speedcure ITX", "Speedcure DETX", "Speedcure EBD", "Speedcure MBB", and "Speedcure BP", and Nippon Kayaku Co., Ltd. "Kayacure DMBI", and the like.

The amount of the photopolymerization initiator used is preferably 0.1% to 10% by mass and more preferably 0.5% to 5% by mass relative to the polymerizable solution. These can be used alone or as a mixture of two or more, and a sensitizer or the like may be added.

(Thermopolymerization Initiator)

The method for producing a polymerizable liquid crystal composition of the present invention requires the step of mixing the polymerizable solution with the polymerization initiator after the step of preparing the polymerizable solution by mixing the polymerizable compound in the organic solvent and heating and stirring the resultant mixture. In addition, a thermopolymerization initiator may be used in combination with the photopolymerization initiator. Examples thereof include Wako Pure Chemical Industries, Ltd. "V-40" and "VF-096", NOF Corporation "Perhexyl D" and "Perhexyl I", and the like.

The amount of the thermopolymerization initiator used is preferably 0.1% to 10% by mass and more preferably 0.5% to 5% by mass relative to the polymerizable solution. These can be used alone or as a mixture of two or more.

The production method of the present invention requires a step of filtering the polymerizable liquid crystal composition with a filter after mixing the polymerizable solution with the polymerization initiator. The pore diameter of the filter is preferably over 0.01 μm to 10 μm or less, more preferably over 0.01 μm to 1 μm or less, and particularly preferably over 0.01 μm to 0.2 μm or less.

Examples of a material of the filter include paper, a cloth, a nonwoven fabric, cellulose, nitrocellulose, cellulose-mixed ester, cellulose acetate, polypropylene, nylon, polytetrafluoroethylene (PTFE), hydrophilic PTFE, polyvinylidene fluoride, polyether sulfone (PES), glass fibers, and the like, but PTFE or polyvinylidene fluoride is preferred.

In the production method of the present invention, filtration is preferably performed with a filtration tower filled with an adsorbent. When the adsorbent is used, the amount of the adsorbent filling in the filtration tower is preferably 0.1% by mass to 20% by mass of the polymerizable liquid crystal composition to be produced.

Further, alumina, silica gel, florisil, diatomite, zeolite, activated carbon, or the like can be used as the adsorbent, and alumina or silica gel is preferred. The adsorbent may be further purified before use.

(Other Components)

The polymerizable liquid crystal composition of the present invention may contain at least one surfactant for decreasing variation in the thickness when formed into an optically anisotropic body. Examples of the surfactant which can be contained include alkyl carboxylate salts, alkyl phosphate salts, alkyl sulfonate salts, fluoroalkyl carboxylate salts, fluoroalkyl phosphate salts, fluoroalkyl sulfonate salts, polyoxyethylene derivatives, fluoroalkylethylene oxide derivatives, polyethylene glycol derivatives, alkyl ammonium salts, fluoroalkyl ammonium salts, silicone derivatives, and the like. Fluorine-containing surfactants and silicone derivatives are particularly preferred. More specific examples thereof include "Megafac F-251", "Megafac F-444", "Megafac F-477", "Megafac F-510", "Megafac F-552", "Megafac F-553", "Megafac F-554", "Megafac F-555", "Megafac F-556", "Megafac F-557", "Megafac F-558", "Megafac F-559", "Megafac F-560", "Megafac F-561", "Megafac F-562", "Megafac F-563", "Megafac F-565", "Megafac F-567", "Megafac F-568", "Megafac F-569", "Megafac F-570", "Megafac F-571", "Megafac R-40", "Megafac R-41", "Megafac R-43", "Megafac R-94", "Megafac RS-72-K", "Megafac RS-75", "Megafac RS-76-E", and "Megafac RS-90" (manufactured by DIC Corporation), "Futagent 100", "Futagent 100C", "Futagent 110", "Futagent 150", "Futagent 150CH", "Futagent A", "Futagent 100A-K", "Futagent 501", "Futagent 300", "Futagent 310", "Futagent 320", "Futagent 400SW", "FTX-400P", "Futagent 251", "Futagent 215M", "Futagent 212MH", "Futagent 250", "Futagent 222F", "Futagent 212D", "FTX-218", "FTX-209F", "FTX-213F", "FTX-233F", "Futagent 245F", "FTX-208G", "FTX-240G", "FTX-206D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730LS", "FTX-730LM", "FTX-730LL", and "FTX-710LL" (manufactured by Neos Co., Ltd.), "BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-Silclean3700" (manufactured by BYK Chemie Japan K. K.), "TEGO Rad2100", "TEGO Rad2200N", "TEGO Rad2250", "TEGO Rad2300", "TEGO Rad2500", "TEGO Rad2600", and "TEGO Rad2700" (manufactured by Tego Co., Ltd.), "N215", "N535", "N605K", and "N935" (manufactured by Solvay Solexis Inc.), and the like.

The amount of the surfactant added is preferably 0.01% to 2% by mass and more preferably 0.05% to 0.5% by mass relative to the polymerizable solution.

The surfactant is preferably added in the step of preparing the polymerizable solution by mixing the polymerizable compound in the organic solvent and heating and stirring the resultant mixture, but may be added in the subsequent step of mixing the polymerizable solution with the polymerization initiator or in both steps.

In order to effectively decrease a tilt angle at an air interface when an optically anisotropic body is produced, the polymerizable composition solution of the present invention preferably contains at least one compound having a repeat unit represented by general formula (5) below and a weight-average molecular weight of 100 or more.

[Chem. 37]

(5)

(In the formula, $R^{11}$, $R^{12}$, $R^{13}$, and $R^{14}$ each independently represent a hydrogen atom, a halogen atom, or a hydrocarbon group having 1 to 20 carbon atoms, and a hydrogen atom in the hydrocarbon group may be substituted by at least one halogen atom.)

Preferred examples of the compound represented by the general formula (5) include polyethylene, polypropylene, polyisobutylene, paraffin, liquid paraffin, chlorinated polypropylene, chlorinated paraffin, chlorinated liquid paraffin, and the like.

The compound represented by the general formula (5) is preferably added in the step of preparing the polymerizable solution by mixing the polymerizable compound in the organic solvent and heating and stirring the resultant mixture, but may be added in the subsequent step of mixing the polymerizable solution with the photopolymerization initiator or in both steps.

The amount of the compound represented by the general formula (5) added is preferably 0.01% to 1% by mass and more preferably 0.05% to 0.5% by mass relative to the polymerizable solution.

Also, in order to further improve the adhesion to a substrate when an optically anisotropic body is produced, a chain transfer agent is preferably added to the polymerizable composition solution of the present invention. The chain transfer agent is preferably a thiol compound, more preferably a monothiol, dithiol, trithiol, or tetrathiol compound, and even more preferably a trithiol compound. Preferred examples thereof include compounds represented by general formulae (6-1) to (6-12) below.

[Chem. 38]

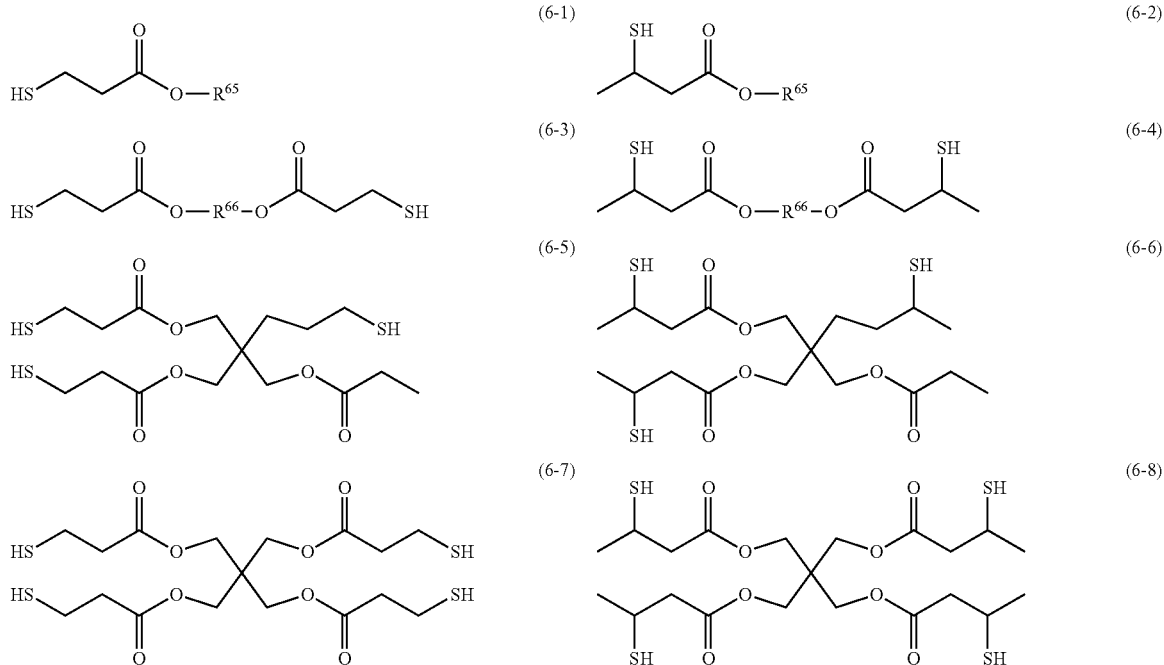

[Chem. 39]

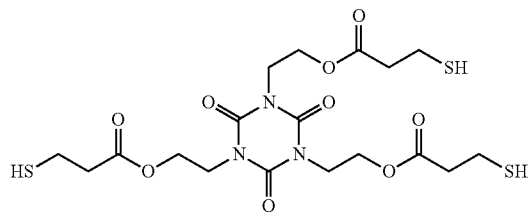

(6-9)

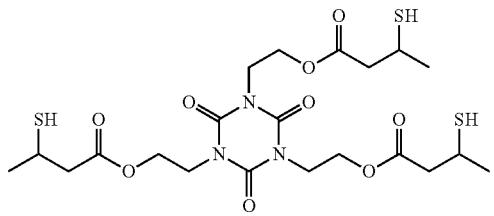

(6-10)

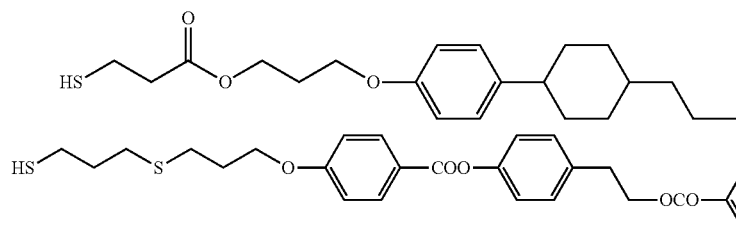

(6-11)

(6-12)

(In the formulae, $R^{65}$ represents an alkyl group having 2 to 18 carbon atoms, the alkyl group may be a linear chain or branched chain, one or more methylene groups present in the alkyl group may be substituted by an oxygen atom, a sulfur atom, —CO—, —OCO—, —COO—, or —CH=CH— so that oxygen atoms or sulfur atoms are not directly bonded to each other, and $R^{66}$ represents an alkylene group having 2 to 18 carbon atoms, one or more methylene groups present in the alkylene group may be substituted by an oxygen atom, a sulfur atom, —CO—, —OCO—, —COO—, or —CH=CH— so that oxygen atoms or sulfur atoms are not directly bonded to each other.)

The chain transfer agent is preferably added in the step of preparing the polymerizable solution by mixing the polymerizable compound in the organic solvent and heating and stirring the resultant mixture, but may be added in the subsequent step of mixing the polymerizable solution with the polymerization initiator or in both steps.

The amount of the chain transfer agent added is preferably 0.5% to 10% by mass and more preferably 1.0% to 5.0% by mass relative to the polymerizable solution.

Further, if required, a liquid crystal compound which is not polymerizable or a polymerizable compound without liquid crystallinity can be added for adjusting physical properties. The polymerizable compound without liquid crystallinity is preferably added in the step of preparing the polymerizable solution by mixing the polymerizable compound in the organic solvent and heating and stirring the resultant mixture, but may be added in the subsequent step of mixing the polymerizable solution with the polymerization initiator or in both steps. The amount of each of the compounds added is preferably 20% by mass or less, more preferably 10% by mass or less, and even more preferably 5% by mass or less relative to the polymerizable solution.
(Method for Producing Optically Anisotropic Body)
(Optically Anisotropic Body)

The optically anisotropic body formed by using the polymerizable liquid crystal composition of the present invention is formed by stacking in order an alignment film and a polymer of the polymerizable liquid crystal composition on a substrate according to demand.

The substrate used for the optically anisotropic body of the present invention is not particularly limited as long as the substrate is generally used for a liquid crystal device, a display, an optical component, and an optical film and is a material having heat resistance to heating during drying after the polymerizable liquid crystal composition of the present invention is applied. Examples of the substrate include a glass substrate, a metal substrate, a ceramic substrate, an organic material such as a plastic substrate, and the like. In particular, when the substrate is an organic material, the material is, for example, a cellulose derivative, polyolefin, polyester, polyolefin, polycarbonate, polyacrylate, polyarylate, polyether sulfone, polyimide, polyphenylene sulfide, polyphenylene ether, nylon, polystyrene, or the like. Among these, plastic substrates such as polyester, polystyrene, polyolefin, a cellulose derivative, polyarylate, polycarbonate, and the like are preferred.

The substrate may be subjected to surface treatment for improving coatability and adhesion of the polymerizable liquid crystal composition of the present invention. Examples of the surface treatment include ozone treatment, plasma treatment, corona treatment, silane coupling treatment, and the like. Also, in order to adjust light transmittance and reflectance, an organic thin film, an inorganic oxide thin film, or a metal thin film is provided on the surface of the substrate by vapor deposition or the like. Alternatively, in order to add an optical added value, the substrate may be a pickup lens, a rod lens, an optical disk, a retardation film, a light diffusion film, a color filter, or the like. In particular, a pickup lens, a retardation film, a light scattering film, or a color filter is preferred because the added value becomes higher.

Also, the substrate is generally subjected to alignment treatment or an alignment film may be provided in order that when the polymerizable composition solution of the present invention is applied and dried, the polymerizable composition is aligned. Examples of alignment treatment include stretching treatment, rubbing treatment, polarized ultraviolet/visible light irradiation treatment, ion beam treatment, and the like. When the alignment film is used, a known common alignment film is used. Examples of the alignment film include polyimide, polysiloxane, polyamide, polyvinyl alcohol, polycarbonate, polystyrene, polyphenylene ether, polyarylate, polyethylene terephthalate, polyether sulfone, epoxy resins, epoxy diacrylate resins, acryl resins, coumarin compounds, chalcone compounds, cinnamate compounds, fulgide compounds, anthraquinone compounds, azo compounds, arylethene compounds, and the like. A compound aligned by rubbing is preferably a compound in which the crystallization of the material is accelerated by alignment or by adding a heating step after alignment. Among compounds aligned by treatment other than rubbing, a photo-alignment material is preferably used.

(Coating)

Examples of a coating method which can be used forming the optically anisotropic body of the present invention include known common methods such as an applicator method, a bar coating method, a spin coating method, a roll coating method, a direct gravure coating method, a reverse gravure coating method, a flexo-coating method, an ink jet method, a die coating method, a cap coating method, a dip coating method, a slit coating method, and the like. The polymerizable liquid crystal composition is applied and then dried.

(Polymerization Step)

The dried polymerizable liquid crystal composition is generally polymerized in a planar alignment state by irradiation with ultraviolet light or the like or by heating. In the case of polymerization by light irradiation, specifically, irradiation with ultraviolet light of 390 nm or less is preferred, and irradiation with light at a wavelength of 250 nm to 370 nm is most preferred. However, when decomposition or the like of the polymerizable liquid crystal composition occurs by ultraviolet light of 390 nm or less, in some cases, polymerization is preferably performed with ultraviolet light of 390 nm or more. The light is preferably diffuse unpolarized light.

EXAMPLES

The preset invention is described below with reference to synthesis examples, examples, and comparative examples, but the present invention is not limited to these examples. In addition, "parts" and "%" are on a mass basis unless otherwise particularly specified.

(Preparation of Polymerizable Liquid Crystal Composition (1))

First, 30 parts of a compound represented by the formula (A-1), 30 parts of a compound represented by the formula (A-2), 15 parts of a compound represented by the formula (B-1), 15 parts of a compound represented by the formula (B-2), 10 parts of a compound represented by the formula (B-3), 0.1 parts of a compound represented by the formula (E-1), 0.1 parts of a compound represented by the formula (G-1), and 0.2 parts of a compound represented by the formula (H-1) were added in 300 parts of methyl isobutyl ketone used as an organic solvent, and the resultant mixture was stirred by using a stirrer having a stirring propeller for 1 hour under the conditions of a stirring speed 500 rpm, and a solution temperature of 80° C. to prepare a polymerizable solution (Step I). Then, the solution temperature was decreased to 50° C., and 6 parts of a photopolymerization initiator (I-1) was added and dissolved and mixed (Step II). Then, the resultant solution was filtered with a membrane filter of 0.2 µm to prepare a polymerizable liquid crystal composition (1) of the present invention.

(Preparation of Polymerizable Liquid Crystal Compositions (2) to (18))

Like in preparation of the polymerizable liquid crystal composition (1) of the present invention, compounds shown in Table 1 or Table 2 were mixed under the solution temperature and stirring speed conditions in the step (I) shown in Table 1 or Table 2. Then, each of photopolymerization initiators shown in Table 1 or Table 2 was added and dissolved and mixed at the solution temperature in the step (II) shown in Table 1 or Table 2. Then, the resultant solutions were filtered with a membrane filter of 0.2 µm to prepare polymerizable liquid crystal compositions (2) to (18) of the present invention.

(Preparation of Comparative Polymerizable Liquid Crystal Composition (C1))

First, 30 parts of a compound represented by the formula (A-1), 30 parts of a compound represented by the formula (A-2), 15 parts of a compound represented by the formula (B-1), 15 parts of a compound represented by the formula (B-2), 10 parts of a compound represented by the formula (B-3), 0.1 parts of a compound represented by the formula (E-1), 0.1 parts of a compound represented by the formula (G-1), 0.2 parts of a compound represented by the formula (H-1), and 6 parts of a photopolymerization initiator (I-1) were added to 300 parts of methyl isobutyl ketone used as an organic solvent, and the resultant mixture was stirred by using a stirrer having a stirring propeller for 1 hour under the conditions of a stirring speed 1000 rpm and a solution temperature of 80° C. Then, the resultant solution was filtered with a membrane filter of 0.2 µm to prepare a comparative polymerizable liquid crystal composition (C1).

(Preparation of Comparative Polymerizable Liquid Crystal Compositions (C2) to (C7))

Like in preparation of the comparative polymerizable liquid crystal composition (C1), compounds represented by formula (A-1) to formula (1-6) shown in Table 3 at ratios shown in Table 3 were stirred and dissolved for 1 hour in methyl isobutyl ketone (D-1) used as an organic solvent under the solution temperature and stirring speed conditions shown in Table 3. Then, the resultant solutions were filtered with a membrane filter of 0.2 µm to prepare comparative polymerizable liquid crystal compositions (2) to (7).

TABLE 1

|       | (1) | (2) | (3) | (4) | (5) | (6) | (7) | (8) | (9) | (10) |
|-------|-----|-----|-----|-----|-----|-----|-----|-----|-----|------|
| (A-1) | 30  | 45  | 45  | 30  | 30  |     | 40  | 34  | 34  | 34   |
| (A-2) | 30  | 45  | 45  | 30  | 30  |     | 30  |     |     |      |
| (A-3) |     |     |     |     |     |     |     | 10  | 10  | 10   |
| (A-4) |     |     |     |     |     | 40  |     |     |     |      |
| (A-5) |     |     |     |     |     | 40  |     |     |     |      |
| (B-1) | 15  | 4   | 4   | 15  | 15  |     |     |     |     |      |
| (B-2) | 15  | 4   | 4   | 15  | 15  |     | 20  |     |     |      |
| (B-3) | 10  | 2   | 2   | 10  | 10  | 20  |     |     |     |      |
| (B-4) |     |     |     |     |     |     |     | 28  | 28  | 28   |
| (B-5) |     |     |     |     |     |     |     | 28  | 28  | 28   |
| (B-6) |     |     |     |     |     |     |     |     |     |      |
| (B-7) |     |     |     |     |     |     |     |     |     |      |

TABLE 1-continued

|       | (1) | (2) | (3) | (4) | (5) | (6) | (7) | (8) | (9) | (10) |
|-------|-----|-----|-----|-----|-----|-----|-----|-----|-----|------|
| (B-8) |     |     |     |     |     |     |     |     |     |      |
| (B-9) |     |     |     |     |     |     |     |     |     |      |
| (B-10)|     |     |     |     |     |     |     |     |     |      |
| (C-1) |     |     |     |     |     |     | 10  |     |     |      |
| (C-2) |     |     |     |     |     |     |     |     |     |      |
| (C-3) |     |     |     |     |     |     |     |     |     |      |
| (C-4) |     |     |     |     |     |     |     |     |     |      |
| (C-5) |     |     |     |     |     |     |     |     |     |      |
| (D-1) | 300 | 300 | 100 | 300 | 300 | 300 | 300 | 300 | 300 | 300  |
| (E-1) | 0.1 | 0.1 | 0.1 | 0.1 | 0.1 | 0.1 | 0.1 | 0.1 | 0.1 | 0.1  |
| (F-1) |     |     |     |     |     |     |     |     |     |      |
| (G-1) | 0.1 | 0.1 | 0.1 | 0.1 | 0.1 |     | 0.1 | 0.1 | 0.1 | 0.1  |
| (H-1) | 0.2 | 0.2 | 0.2 | 0.2 | 0.2 | 0.1 |     | 0.2 | 0.2 | 0.2  |
| (I-1) | 6   | 6   | 6   |     | 6   | 6   | 6   | 6   | 4   |      |
| (I-2) |     |     |     | 1   |     |     |     |     |     | 1    |
| (I-3) |     |     |     |     |     |     |     |     | 1   |      |
| (I-4) |     |     |     | 1   |     |     |     |     |     | 1    |
| (I-5) |     |     |     |     |     |     |     |     |     |      |
| (I-6) |     |     |     |     |     |     |     |     |     |      |
| Step (I) |  |     |     |     |     |     |     |     |     |      |
| Solution temperature | 80 | 80 | 80 | 80 | 80 | 80 | 80 | 80 | 80 | 80 |
| Stirring rotational speed | 500 | 500 | 500 | 500 | 150 | 500 | 500 | 500 | 500 | 500 |
| Step (II) |     |     |     |     |     |     |     |     |     |      |
| Solution temperature | 50 | 50 | 50 | 50 | 50 | 50 | 50 | 50 | 50 | 50 |

TABLE 2

|       | (11) | (12) | (13) | (14) | (15) | (16) | (17) | (18) |
|-------|------|------|------|------|------|------|------|------|
| (A-1) |      | 10   | 24   | 30   | 12   |      | 55   | 50   |
| (A-2) |      |      |      |      |      |      |      |      |
| (A-3) | 30   | 20   | 24   |      | 3    | 20   | 15   |      |
| (A-4) |      |      |      |      |      |      |      |      |
| (A-5) |      |      |      |      |      |      |      |      |
| (B-1) |      |      |      |      |      |      |      |      |
| (B-2) |      |      |      |      |      |      |      |      |
| (B-3) |      |      |      |      |      |      |      |      |
| (B-4) | 28   | 25   | 20   | 30   |      |      | 10   | 3    |
| (B-5) | 14   | 25   |      |      |      |      | 20   | 7    |
| (B-6) | 28   |      | 32   | 40   | 12   | 10   |      |      |
| (B-7) |      |      |      |      | 70   |      |      |      |
| (B-8) |      |      |      |      |      |      |      | 30   |
| (B-9) |      | 10   |      |      |      |      |      |      |
| (B-10)|      | 10   |      |      |      |      |      |      |
| (C-1) |      |      |      |      |      |      |      |      |
| (C-2) |      |      |      |      |      | 3    |      |      |
| (C-3) |      |      |      |      |      | 5    |      |      |
| (C-4) |      |      |      |      |      | 65   |      |      |
| (C-5) |      |      |      |      |      |      | 10   |      |
| (D-1) | 300  | 300  | 300  | 300  | 300  | 300  | 300  | 300  |
| (E-1) | 0.1  | 0.1  |      | 0.1  | 0.1  | 0.1  | 0.1  | 0.1  |
| (F-1) |      |      | 0.1  |      |      |      |      |      |
| (G-1) | 0.1  | 0.1  |      |      | 0.1  | 0.1  | 0.1  | 0.1  |
| (H-1) | 0.2  | 0.2  | 0.1  |      |      | 0.2  | 0.2  | 0.2  |
| (I-1) | 6    |      | 6    | 7    | 6    |      |      |      |
| (I-2) |      | 1    |      |      |      |      |      |      |
| (I-3) |      |      |      |      |      |      |      |      |
| (I-4) |      | 1    |      |      |      |      |      |      |
| (I-5) |      |      |      |      |      | 2    | 2    | 4    |
| (I-6) |      |      |      |      |      | 2    |      |      |
| Step (I) |   |      |      |      |      |      |      |      |
| Solution temperature | 80 | 80 | 80 | 80 | 80 | 80 | 80 | 80 |
| Stirring rotational speed | 500 | 500 | 500 | 500 | 500 | 500 | 500 | 500 |
| Step (II) |   |      |      |      |      |      |      |      |
| Solution temperature | 50 | 50 | 50 | 50 | 50 | 50 | 50 | 50 |

TABLE 3

| Comparative solution | (C1) | (C2) | (C3) | (C4) | (C5) | (C6) |
|----------------------|------|------|------|------|------|------|
| (A-1) | 30  | 45  | 45  | 30  | 30  | 34  |
| (A-2) | 30  | 45  | 45  | 30  | 30  |     |
| (A-3) |     |     |     |     |     | 10  |
| (A-4) |     |     |     |     |     |     |
| (A-5) |     |     |     |     |     |     |
| (B-1) | 15  | 4   | 4   | 15  | 15  |     |
| (B-2) | 15  | 4   | 4   | 15  | 15  |     |
| (B-3) | 10  | 2   | 2   | 10  | 10  |     |
| (B-4) |     |     |     |     |     | 28  |
| (B-5) |     |     |     |     |     | 28  |
| (B-6) |     |     |     |     |     |     |
| (B-7) |     |     |     |     |     |     |
| (B-8) |     |     |     |     |     |     |
| (B-9) |     |     |     |     |     |     |
| (B-10)|     |     |     |     |     |     |
| (C-1) |     |     |     |     |     |     |
| (C-2) |     |     |     |     |     |     |
| (C-3) |     |     |     |     |     |     |
| (C-4) |     |     |     |     |     |     |
| (C-5) |     |     |     |     |     |     |
| (D-1) | 300 | 300 | 100 | 300 | 300 | 300 |
| (E-1) | 0.1 | 0.1 | 0.1 | 0.1 | 0.1 | 0.1 |
| (F-1) |     |     |     |     |     |     |
| (G-1) | 0.1 | 0.1 | 0.1 | 0.1 | 0.1 | 0.1 |
| (H-1) | 0.2 | 0.2 | 0.2 | 0.2 | 0.2 | 0.1 |
| (I-1) | 6   | 6   | 6   |     | 6   | 6   |
| (I-2) |     |     |     | 1   |     |     |
| (I-3) |     |     |     |     |     |     |
| (I-4) |     |     |     |     | 1   |     |
| (I-5) |     |     |     |     |     |     |
| (I-6) |     |     |     |     |     |     |
| Solution temperature | 80 | 80 | 80 | 80 | 80 | 80 |
| Stirring rotational speed | 500 | 500 | 500 | 500 | 10 | 500 |

[Chem. 40]
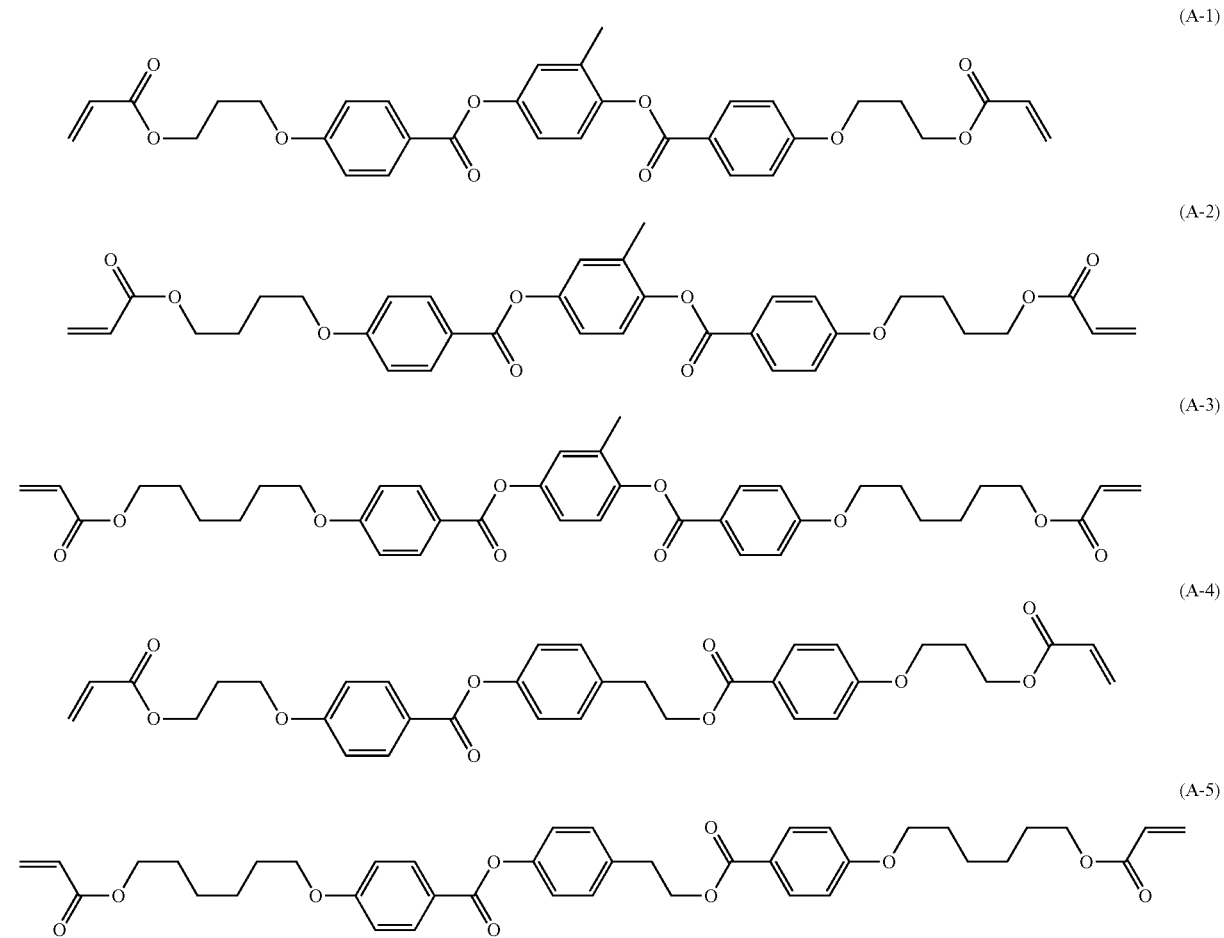
(A-1)
(A-2)
(A-3)
(A-4)
(A-5)
[Chem. 41]
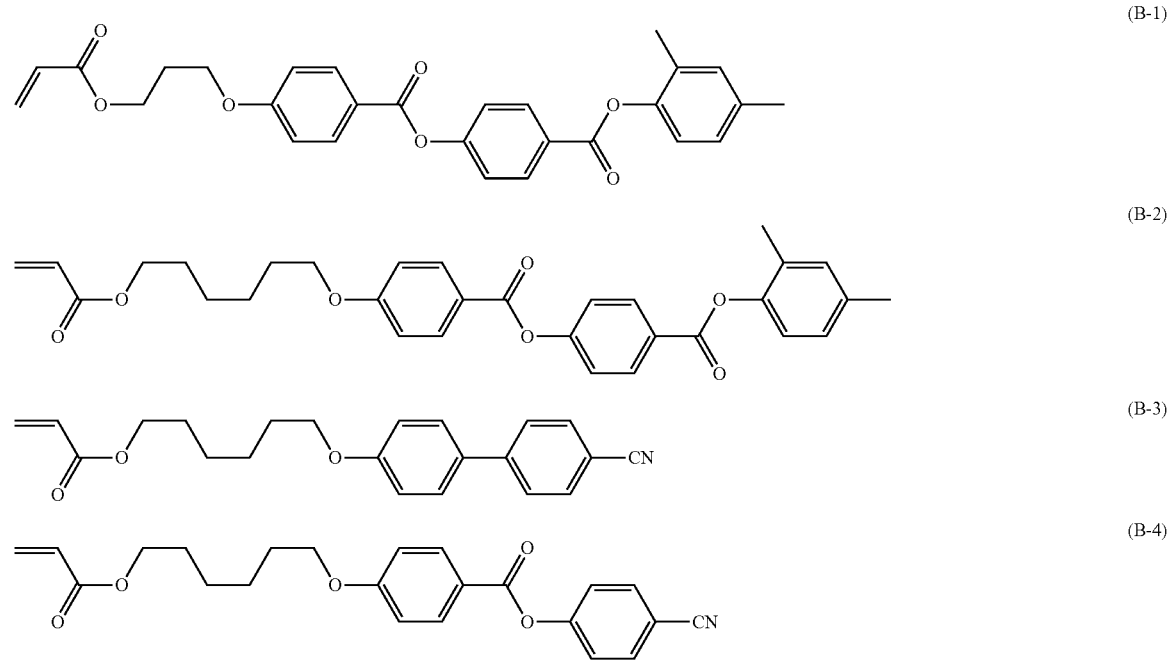
(B-1)
(B-2)
(B-3)
(B-4)

-continued
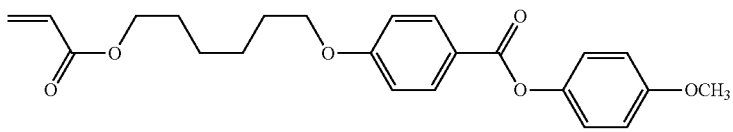 (B-5)
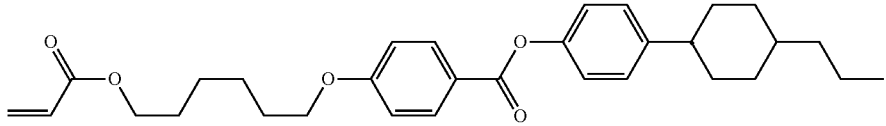 (B-6)
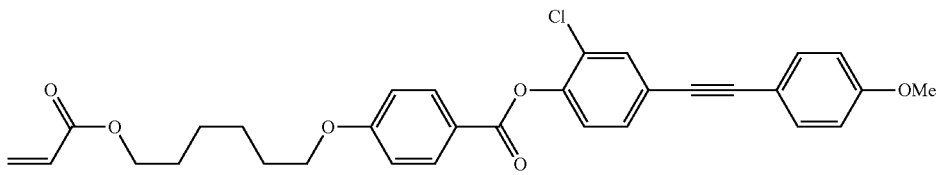 (B-7)
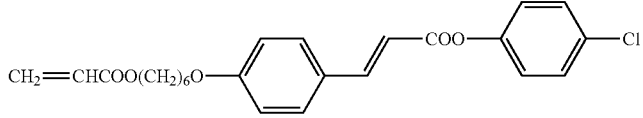 (B-8)
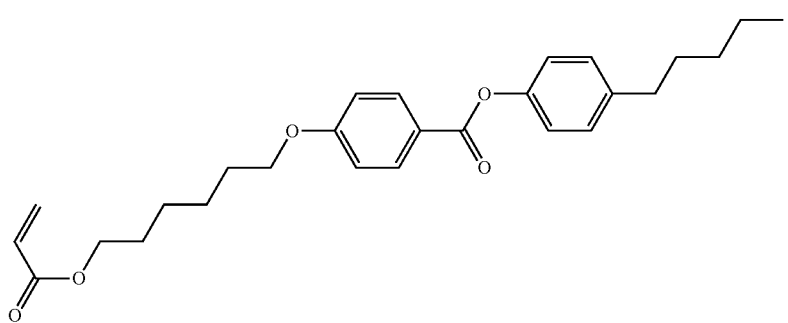 (B-9)
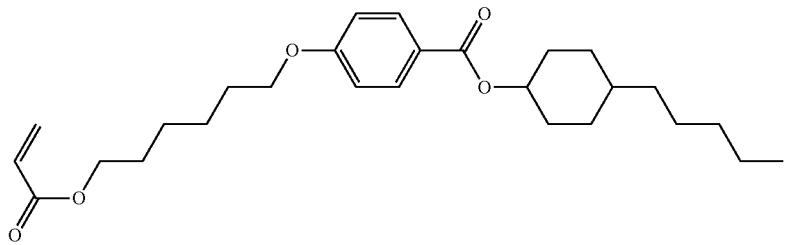 (B-10)
[Chem. 42]
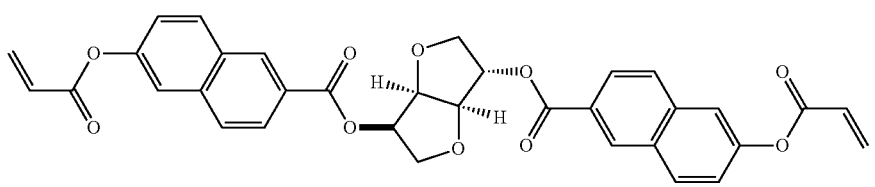 (C-1)

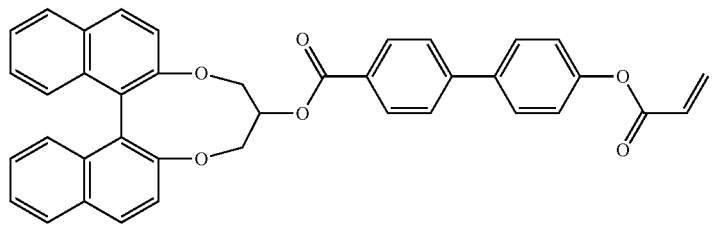

(C-2)

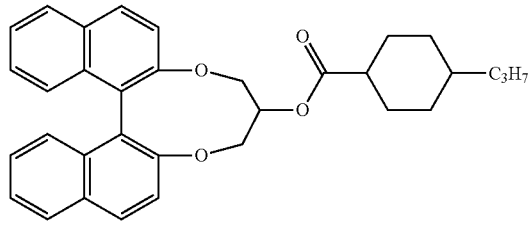

(C-3)

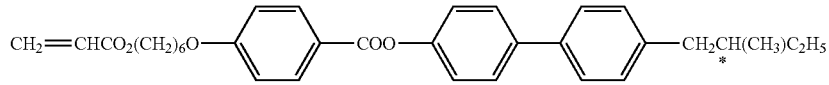

(C-4)

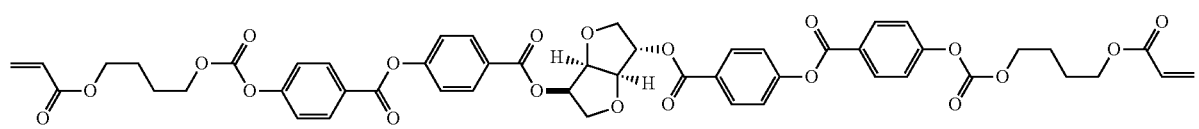

(C-5)

Methyl isobutyl ketone (D-1)
p-Methoxyphenol (E-1)
IRGANOX 1076 (F-1)
Liquid paraffin (G-1)
Megafac F-554 (H-1)
Irgacure 907 (I-1)
Irgacure 651 (I-2)
Lucirin TPO (I-3)
V-40 (I-4)

[Chem. 43]

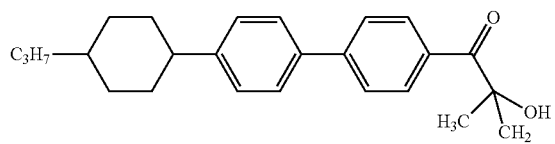

(I-5)

[Chem. 44]

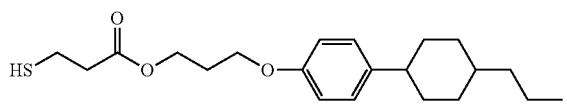

(I-6)

Examples 1 to 18 and Comparative Examples 1 to 6

(Alignment 1 to 4)

Each of the prepared polymerizable liquid crystal compositions was applied to a TAC (triacetyl cellulose) film by using a bar coater #4 at room temperature and then dried at 80° C. for 2 minutes. Then, the film was allowed to stand at room temperature for 15 minutes and then irradiated with UV light by using a conveyor-type high-pressure mercury lamp so that illuminance was set to 500 mJ/cm² (alignment 1).

A polyimide solution for an alignment film was applied to a glass substrate having a thickness of 0.7 mm by using a spin coating method at room temperature, dried at 100° C. for 10 minutes, and then fired at 200° C. for 60 minutes to form a coating film. The resultant coating film was rubbed to produce a substrate. The prepared polymerizable liquid crystal composition was applied to the substrate by using a spin coater and then dried at 80° C. for 2 minutes. Then immediately, the substrate was irradiated with UV light so that the illuminance was set to 500 mJ/cm (alignment 2).

V1a-100 (manufactured by DIC Corporation) was applied to a glass substrate by using a spin coater and then dried at 80° C. for 1 minute. The resultant coating film having a dry thickness of 15 nm was irradiated (irradiation amount: 100 mJ/cm²) with linearly-polarized and parallel light of visible-ultraviolet light (irradiation intensity: 20 mW/cm²) near a wavelength of 365 nm in a direction perpendicular to the substrate from an ultrahigh pressure mercury lamp through a wavelength cut filter, a band pass filter, and a polarization filter, thereby producing the substrate on which a photo-aligned film was laminated. The prepared polymerizable liquid crystal composition was applied to the resultant substrate by using a spin coater and then dried at 80° C. for 2 minutes. Then immediately, the substrate was irradiated with UV light so that the illuminance was set to 500 mJ/cm² (alignment 3).

The prepared polymerizable liquid crystal composition was applied to a glass substrate by using a spin coater and then dried at 80° C. for 2 minutes. Then, the substrate was allowed to stand at room temperature for 2 minutes and then irradiated with UV light so that the illuminance was set to 500 mJ/cm² (alignment 4).

A: No defect was found by visual observation and no defect was found by polarizing microscope observation.

B: No defect was found by visual observation but unaligned portions were present overall by polarizing microscope observation.

C: Defects were partially found by visual observation and unaligned portions were present overall by polarizing microscope observation.

Among the results of alignment measurement, a result shown by "-" represents that alignment is evaluated as "-" because when the polymerizable liquid crystal composition used has a composition showing horizontal alignment, alignment cannot be evaluated unless observed on an alignment layer having uniaxial alignment regulating force by rubbing, and that alignment is evaluated as "-" because when the polymerizable liquid crystal composition used has a composition showing vertical alignment, alignment cannot be evaluated on an alignment layer having uniaxial alignment regulating force by rubbing.

(Cissing Evaluation)

V1a-100 (manufactured by DIC Corporation) was applied to a TAC film by using a spin coater and then dried at 80° C. for 1 minute. The resultant coating film having a dry thickness of 15 nm was irradiated (irradiation amount: 100 mJ/cm²) with linearly-polarized and parallel light of visible/ultraviolet light (irradiation intensity: 20 mW/cm²) near a wavelength of 365 nm in a direction perpendicular to the substrate from a ultrahigh pressure mercury lamp through a wavelength cut filter, a band pass filter, and a polarization filter, thereby producing the substrate on which a photo-aligned film was laminated. The prepared polymerizable liquid crystal composition was applied to the resultant substrate by using a spin coater #4 and then dried at 80° C. for 2 minutes. Then, the substrate was stored at room temperature for 15 minutes and irradiated with UV light of 500 mJ/cm2 by using a conveyor-type high-pressure mercury lamp. A degree of cissing of the resultant coating film was visually observed.

A: No cissing defect was observed on the surface of the coating film.

B: Very few cissing defects were observed on the surface of the coating film.

C: Few cissing defects were observed on the surface of the coating film.

D: Many cissing defects were observed on the surface of the coating film.

(Coloring Property)

A degree of coloring of the polymerizable liquid crystal composition after filtering was measured by using an ultraviolet/visible spectrophotometer.

A: A degree of coloring of less than 3.

B: A degree of coloring of 3 or more and less than 5.

C: A degree of coloring of 5 or more and less than 10.

D: A degree of coloring of 10 or more.

(Storage Stability)

The state of the solution was observed after the prepared polymerizable liquid crystal composition was stored at 40° C. for 1 month.

A: No precipitate was found and the solution remained uniform.

B: A precipitate was confirmed in only a portion and the solution was substantially uniform.

C: A precipitate was confirmed and the solution was clouded.

The obtained results are shown in Table 4 below.

TABLE 4

| | Solution | Alignment 1 | Alignment 2 | Alignment 3 | Alignment 4 | Cissing evaluation | Coloring property | Storage stability |
|---|---|---|---|---|---|---|---|---|
| Example 1 | Solution (1) | A | A | A | — | A | A | A |
| Example 2 | Solution (2) | A | A | A | — | A | A | A |
| Example 3 | Solution (3) | A | A | A | — | A | A | A |
| Example 4 | Solution (4) | A | A | A | — | A | A | A |
| Example 5 | Solution (5) | A | A | A | — | A | A | A |
| Example 6 | Solution (6) | — | — | — | A | A | A | A |
| Example 7 | Solution (7) | A | A | A | — | A | A | A |
| Example 8 | Solution (8) | A | A | A | — | A | A | A |
| Example 9 | Solution (9) | A | A | A | — | A | A | A |
| Example 10 | Solution (10) | A | A | A | — | A | A | A |
| Example 11 | Solution (11) | A | A | A | — | A | A | A |
| Example 12 | Solution (12) | A | A | A | — | A | A | A |
| Example 13 | Solution (13) | — | — | — | A | A | A | A |
| Example 14 | Solution (14) | A | A | A | — | A | A | A |
| Example 15 | Solution (15) | A | A | A | — | A | A | A |
| Example 16 | Solution (16) | A | A | A | — | A | A | A |
| Example 17 | Solution (17) | A | A | A | — | A | A | A |
| Example 18 | Solution (18) | A | A | A | — | A | A | A |
| Comparative Example 1 | Solution (C1) | A | A | A | — | B | C | B |
| Comparative Example 2 | Solution (C2) | B | A | B | — | B | C | B |
| Comparative Example 3 | Solution (C3) | B | A | B | — | B | C | B |
| Comparative Example 4 | Solution (C4) | B | B | B | — | D | C | C |
| Comparative Example 5 | Solution (C5) | A | A | A | — | B | C | B |
| Comparative Example 6 | Solution (C6) | — | — | — | A | C | C | B |

Examples 1 to 18 and Comparative Examples 1 to 6

As a result, any one of the compositions produced by the method for producing a polymerizable liquid crystal composition of the present invention was not colored, and the composition was confirmed to cause no precipitate and maintained the same state as when prepared. Further, the good results of alignment tests and a good cissing property were exhibited, and the composition produced by the method for producing a polymerizable liquid crystal composition of the present invention is considered to have excellent productivity.

On the other hand, the results of Comparative Examples 1 to 6 show that when the photopolymerization initiator is mixed in preparing the polymerizable solution by mixing the polymerizable compound in the organic solvent, coloring and precipitate are confirmed in the resultant polymerizable liquid crystal composition, and the results of alignment tests and the cissing property are inferior to those obtained by using the compositions produced by the method for producing a polymerizable liquid crystal composition of the present invention.

The invention claimed is:

1. A method for producing a polymerizable liquid crystal composition solution, the method comprising:
    a step (I) of preparing a uniform polymerizable solution comprising:
        mixing at least one polymerizable compound having at least one polymerizable functional group and showing liquid crystallinity, and one or two or more organic solvents to provide a mixture; and
        heating and stirring the mixture at a temperature to provide the uniform polymerization solution; and
    a step (II) of mixing the uniform polymerizable solution with a polymerization initiator at a temperature of 15° C. to 50° C., the temperature of the Step (II) being lower than the temperature of the Step (I).

2. The method for producing a polymerizable liquid crystal composition solution according to claim 1, further comprising performing filtration after the step (II).

3. The method for producing a polymerizable liquid crystal composition solution according to claim 1, wherein the concentration of the polymerizable compound in the polymerizable solution is 5% by mass to 50% by mass.

4. The method for producing a polymerizable liquid crystal composition solution according to claim 1, wherein the temperature of the Step (II) is 20° C. or more, lower than the temperature of the Step (I).

5. The method for producing a polymerizable liquid crystal composition solution according to claim 1, wherein in the step of preparing the polymerizable solution by heating and stirring, the stirring rotational speed is 10 rpm to 1000 rpm.

6. The method for producing a polymerizable liquid crystal composition solution according to claim 1, wherein in the step of preparing the polymerizable solution, a polymerization initiator and/or an antioxidant is mixed.

7. The method for producing a polymerizable liquid crystal composition solution according to claim 1, wherein the at least one polymerizable compound is a compound represented by general formula (1), $$\text{P-(Sp)}_m\text{-MG-R}^1 \tag{1}$$

wherein in the formula (1), P represents a polymerizable functional group,

Sp represents an alkylene group having 0 to 18 carbon atoms in which a hydrogen atom in the alkylene group may be substituted by one or more halogen atoms or CN, and one $CH_2$ group or two or more unadjacent $CH_2$ groups present in the alkylene group may be each independently substituted by —O—, —S—, —NH—, —N($CH_3$)—, —CO—, —COO—, —OCO—, —OCOO—, —SCO—, —COS—, or —C≡C— in a form in which oxygen atoms are not directly bonded to each other, m represents 0 or 1, MG represents a mesogenic group, $R^1$ represents a hydrogen atom, a halogen atom, a cyano group, an alkyl group having 1 to 18 carbon atoms, the alkyl group may be substituted by one or more halogen atoms or CN, and one $CH_2$ group or two or more unadjacent $CH_2$ groups present in the alkyl group may be each independently substituted by —O—, —S—, —NH—, —N($CH_3$)—, —CO—, —COO—, —OCO—, —OCOO—, —SCO—, —COS—, or —C≡C— in a form in which oxygen atoms are not directly bonded to each other, or $R^1$ represents a structure represented by general formula (1-a), $$\text{-(Sp)}_m\text{-P} \tag{1-a}$$

wherein in the formula (1-a), P represents a reactive functional group, Sp represents a spacer group having 0 to 18 carbon atoms, and m represents 0 or 1, and when a plurality of each of P and Sp are present, they may be the same or different.

8. The method for producing a polymerizable liquid crystal composition solution according to claim 7, wherein in the general formula (1), MG is represented by general formula (1-b), $$\text{-Z0-(A1-Z1)}_n\text{-A2-Z2-A3-Z3-} \tag{1-b}$$

wherein in the formula (1-b), A1, A2, and A3 each independently represent a 1,4-phenylene group, a 1,4-cyclohexylene group, a 1,4-cyclohexenyl group, a tetrahydropyran-2,5-diyl group, a 1,3-dioxane-2,5-diyl group, a tetrahydrothiopyran-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, a 1,4-naphthylene group, a benzo[1,2-b:4,5-b']dithiophene-2,6-diyl group, a benzo[1,2-b:4,5-b']diselenophene-2,6-diyl group, a [1]benzothieno[3,2-b]thiophene-2,7-diyl group, a [1]benzoselenopheno[3,2-b]selenophene-2,7-diyl group, or a fluorene-2,7-diyl group, which may have as a substituent one or more of F, Cl, $CF_3$, $OCF_3$, a CN group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, an alkenoyloxy group, and/or the general formula (1-a), Z0, Z1, Z2, and Z3 each independently represent —COO—, —OCO—, —$CH_2CH_2$—, —$OCH_2$—, —$CH_2O$—, —CH=CH—, —C≡C—, —CH=CHCOO—, —OCOCH=CH—, —$CH_2CH_2$COO—, —$CH_2CH_2$OCO—, —COO$CH_2CH_2$—, —OCO$CH_2CH_2$—, —CONH—, —NHCO—, an alkyl group having 2 to 10 carbon atoms which may have a halogen atom, or a single bond, n represents 0, 1, or 2, and when a plurality of each of A1 and Z1 are present, they may be the same or different.

9. The method for producing a polymerizable liquid crystal composition solution according to claim 7, wherein a compound represented by the general formula (1) in which $R^1$ is general formula (1-a) is contained.

10. The method for producing a polymerizable liquid crystal composition solution according to claim 7, wherein a compound represented by the general formula (1) and having a melting point of 100° C. or more is contained.

11. The method for producing a polymerizable liquid crystal composition solution according to claim 1, further comprising filtering the polymerizable liquid crystal composition solution after the step (II), wherein when a degree of coloring of the polymerizable liquid crystal composition solution is measured by using an ultraviolet/visible spectrophotometer, the degree of coloring is less than 3.

12. The method for producing a polymerizable liquid crystal composition solution according to claim 1, wherein when the polymerizable liquid crystal composition solution is stored at 40° C. for 1 month followed by observing a state of the polymerizable liquid crystal composition solution, no precipitate is found and the polymerizable liquid crystal composition solution remains uniform.

* * * * *